United States Patent
Smith

(10) Patent No.: US 9,323,373 B2
(45) Date of Patent: Apr. 26, 2016

(54) TOUCH SCREEN DISPLAY DEVICE

(75) Inventor: Euan Smith, Longstanton (GB)

(73) Assignee: CAMBRIDGE DISPLAY TECHNOLOGY LIMITED, Cambridgeshire (GB)

(*) Notice: Subject to any disclaimer, the term of this patent is extended or adjusted under 35 U.S.C. 154(b) by 133 days.

(21) Appl. No.: 13/391,960

(22) PCT Filed: Sep. 1, 2010

(86) PCT No.: PCT/GB2010/001655
§ 371 (c)(1),
(2), (4) Date: Apr. 5, 2012

(87) PCT Pub. No.: WO2011/027111
PCT Pub. Date: Mar. 10, 2011

(65) Prior Publication Data
US 2012/0188188 A1 Jul. 26, 2012

(30) Foreign Application Priority Data
Sep. 4, 2009 (GB) .................................. 0915460.0

(51) Int. Cl.
G06F 3/041 (2006.01)
G06F 3/042 (2006.01)

(52) U.S. Cl.
CPC .............. *G06F 3/0412* (2013.01); *G06F 3/042* (2013.01); *G06F 2203/04109* (2013.01)

(58) Field of Classification Search
CPC .................... G06F 2203/04109; G06F 3/0412; G06F 3/042
USPC ............. 345/156, 173–184; 178/18.01–18.06
See application file for complete search history.

(56) References Cited

U.S. PATENT DOCUMENTS

| | | | |
|---|---|---|---|
| 4,539,507 A | 9/1985 | VanSlyke et al. | |
| 6,130,663 A | 10/2000 | Null | |

(Continued)

FOREIGN PATENT DOCUMENTS

| | | |
|---|---|---|
| EP | 1 744 241 A1 | 1/2007 |
| GB | 2 421 304 A | 6/2006 |

(Continued)

OTHER PUBLICATIONS

Harmuth et al., "Applications of Walsh Functions in Communications," IEEE Spectrum, IEEE Inc., 6(11):82-91 (1969).

(Continued)

*Primary Examiner* — Amare Mengistu
*Assistant Examiner* — Insa Sadio
(74) *Attorney, Agent, or Firm* — Marshall, Gerstein & Borun LLP

(57) ABSTRACT

A touch screen display device includes a plurality of display pixels for generating an image, emitters interspersed among the display pixels and emitting light, and detectors interspersed among the display pixels for detecting light. The light from the emitters is coupled into a transparent substrate to reach the front surface which transmits light incident at an angle smaller than a critical angle and which totally internally reflects light which is incident at an angle greater than the critical angle. The display device further includes processing means coupled to the emitters and detectors for detecting the light reaching each detector from different specific emitters and determining the light that is received by each detector that may be due to direct reflection from a near-field object, and the light that is totally internally reflected and which may be frustrated by a touching object.

16 Claims, 2 Drawing Sheets

(56) References Cited

U.S. PATENT DOCUMENTS

| | | |
|---|---|---|
| 2004/0245438 A1 | 12/2004 | Payne et al. |
| 2005/0219229 A1 | 10/2005 | Yamaguchi |
| 2006/0192766 A1* | 8/2006 | Nakamura et al. ............ 345/173 |
| 2006/0244693 A1 | 11/2006 | Yamaguchi et al. |
| 2008/0074401 A1 | 3/2008 | Chung et al. |
| 2008/0088603 A1* | 4/2008 | Eliasson et al. ............... 345/176 |
| 2008/0252619 A1* | 10/2008 | Crockett et al. ............ 345/175 |
| 2009/0002329 A1 | 1/2009 | Van Genechten et al. |
| 2009/0002340 A1 | 1/2009 | Van Genechten |
| 2009/0139778 A1* | 6/2009 | Butler et al. ............... 178/18.03 |

FOREIGN PATENT DOCUMENTS

| | | |
|---|---|---|
| WO | WO-90/13148 A1 | 11/1990 |
| WO | WO-95/06400 A1 | 3/1995 |
| WO | WO-99/21935 A1 | 5/1999 |
| WO | WO-99/48160 A1 | 9/1999 |
| WO | WO-02/067343 A1 | 8/2002 |
| WO | WO-03/083767 A2 | 10/2003 |
| WO | WO-2004/081502 A2 | 9/2004 |
| WO | WO-2008/004103 A2 | 1/2008 |
| WO | WO-2008/017077 A2 | 2/2008 |
| WO | WO-2010/132076 A1 | 11/2010 |

OTHER PUBLICATIONS

"Walsh Function," Wolfram MathWorld™ (1999-2012). Retrieved from the Internet on Jun. 20, 2012: URL:http://mathworld.wolfram.com/WalshFuntion.html.

Weisstein, "Hadamard Matrix," Mathworld—A Wolfram Web Resource ( © 1992-2012). Retrieved from the Internet on May 25, 2012: URL:http://mathworld.wolfram.com/HadamardMatrix.html.

Wikipedia®, "Hadamard Matrix," (2010). Retrieved from the Internet on May 25, 2012: URL:http://en.wikipedia.org/wiki/Hadarnard_matrix.

Wikipedia®, "Walsh Function," (2012). Retrieved from the Internet on Jun. 20, 2012: URL:http://_en.wikipedia.org/wiki/Walsh_function.

International Preliminary Report on Patentability for Application No. PCT/GB2010/001655, dated Mar. 6, 2012.

International Search Report and Written Opinion for Application No. PCT/GB2010/001655, dated Dec. 30, 2010.

Search Report for Application No. GB0915460.0, dated Dec. 16, 2009.

* cited by examiner

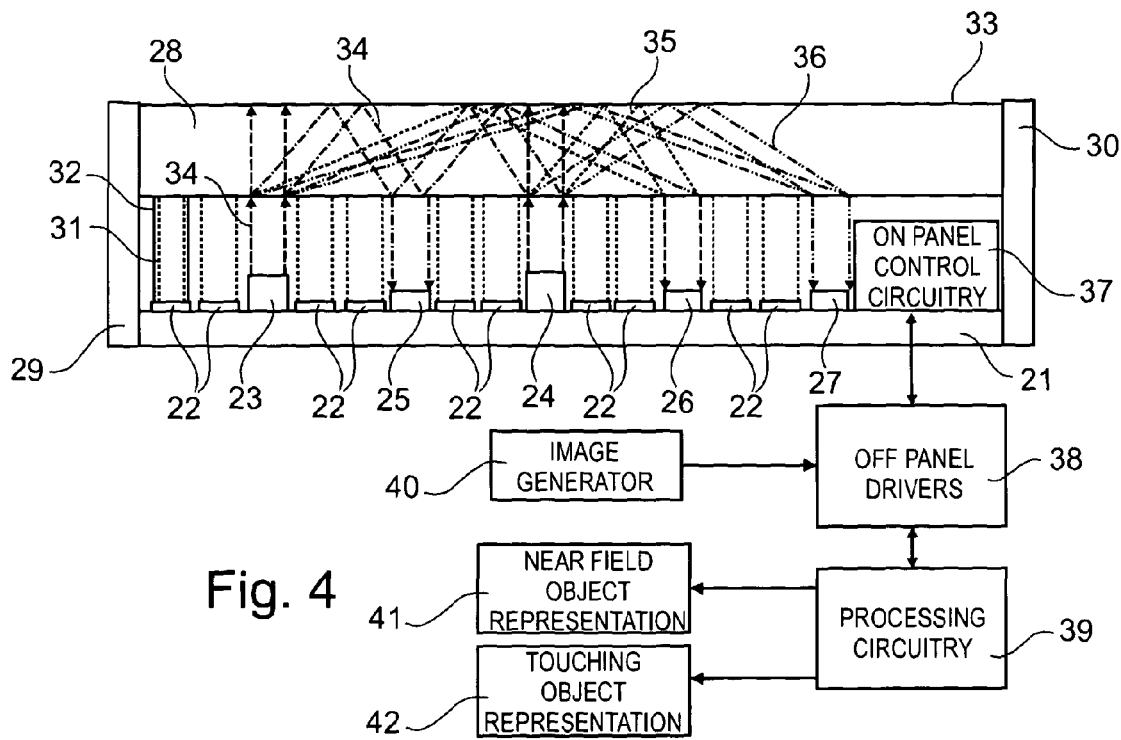
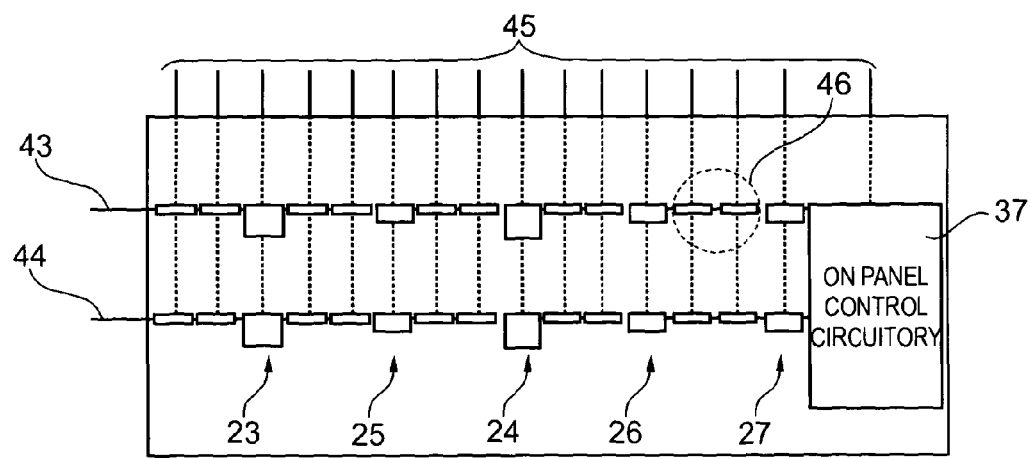
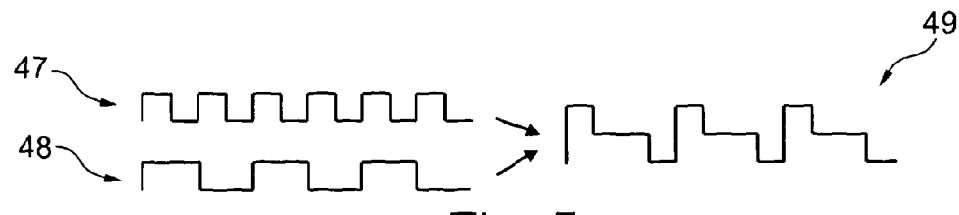
Fig. 5

TOUCH SCREEN DISPLAY DEVICE

BACKGROUND OF THE INVENTION

1. Field of the Invention

This invention relates to a touch screen display device, particularly, though not exclusively, to optical (including infra-red) touch screen display screens, which may be integrated as part of an Organic Light Emitting Diode (OLED) display device.

2. Related Technology

It is known to provide infra-red touch screen technology integrated into Liquid Crystal Diode (LCD) displays. However, such technology can only detect the presence of an object touching the screen; it does not actually provide images of the objects, hence does not provide information regarding their size and shape and cannot, for example, recognize bar codes. Furthermore, it has proved difficult to integrate infra-red emitters and detectors onto a single back plane together with the LCDs. In general, the infra-red emitters and detectors are positioned behind the LCD plane, which is more complicated, and therefore costly, to manufacture.

Near field optical touch screens are known, in which the presence of a near field object, i.e. an object that is close to, but not actually touching, the display screen is detected using proximity detection. Optical touch screens which detect the presence of an object that actually touches the display screen are also known, where the touching object is detected using Frustrated Total Internal Reflection (FTIR). In this case, the light from the emitter is totally internally reflected from the surface of the display and is detected by detectors positioned in a line from that emitter. If an object touches the surface of the display, the total internal reflection is frustrated, since the light is absorbed by the object touching the surface of the screen. In this way, by having a plurality of rows and columns of detectors, the position of the object can be determined by detecting in which row and which column the total internal reflection is frustrated.

SUMMARY OF THE INVENTION

The present invention seeks to provide an improved touch screen display device.

According to a first aspect of the present invention, there is provided a touch screen display device comprising a plurality of display pixels and a transparent body having a front surface, a plurality of emitters interspersed among the display pixels and emitting electromagnetic radiation so as to reach the front surface through the transparent body, and a plurality of detectors interspersed among the display pixels for detecting electromagnetic radiation, wherein the electromagnetic radiation which is emitted by an emitter at an angle smaller than the critical angle to the normal to said front surface off the transparent body is transmitted through said front surface and the electromagnetic radiation which is emitted by the emitter at an angle greater than the critical angle to the normal to said front surface is totally internally reflected, the touch screen display device further comprising processing apparatus coupled to the emitters and detectors operable to identify the electromagnetic radiation reaching each detector from different specific emitters and to discriminate between a. electromagnetic radiation that may be received by each detector by reflection from an object adjacent but not touching said front surface, and b. electromagnetic radiation the total internal reflection of which may be frustrated by an object touching said front surface.

According to a second aspect of the present invention, there is provided a method of discriminating between an object touching the surface of a display and an object adjacent, but not touching the display, the method comprising:
illuminating a transparent body defining the said surface of the display with electromagnetic radiation through the transparent body, the electromagnetic radiation having a range of incident angles to the surface, the range of incident angles including angles greater and smaller than the critical angle for total internal reflection;
measuring the intensity of electromagnetic radiation coming back from the surface of the transparent body; and
identifying a reduction in the measured intensity as the presence of an object in contact with the surface, and identifying an increase in the measured intensity as the presence of an object adjacent but not touching said surface.

The present invention is particularly suitable for integration as part of an Organic Light Emitting Diode (OLED) display device.

Organic light emitting diodes (OLEDs) comprise a particularly advantageous form of electro-optic display. They are bright, colourful, fast switching, provide a wide viewing angle and are easy and cheap to fabricate on a variety of substrates.

Organic (which here includes organometallic) LEDs may be fabricated using either polymers or small molecules in a range of colours, depending upon the materials used. Examples of polymer-based organic LEDs are described in WO 90/13148, WO 95/06400 and WO 99/48160; examples of small molecule based devices are described in U.S. Pat. No. 4,539,507 and examples of dendrimer-based materials are described in WO99/21935 and WO02/067343.

A basic structure of a typical organic LED involves a glass or plastic substrate supporting a transparent anode layer comprising, for example, indium tin oxide (ITO) on which is deposited a hole transport layer, an electroluminescent layer and a cathode. The electroluminescent layer, may comprise, for example, PEDOT: PSS (polystyrene-sulphorate—doped polyethylene—dioxythiophene). The cathode layer typically comprises a low work function metal such as calcium and may include an additional layer immediately adjacent electroluminescent layer, such as a layer of aluminium, for improved electron energy level matching. Contact wires to the anode and the cathode respectively provide a connection to a power source. The same basic structure may also be employed for small molecule devices. In this structure, light can be emitted through the transparent anode and substrate and devices with this structure are referred to as "bottom emitters". Devices which emit through the cathode may also be constructed, for example, by keeping the thickness of the cathode layer to less than around 50-100 mm so that the cathode is substantially transparent.

Organic LEDs may be deposited on a substrate in a matrix of pixels to form a single or multi-colour pixellated display. A multi-coloured display may be constructed using groups of red, green and blue emitting pixels. In such displays the individual elements are generally addressed by activating row (or column) lines to select the pixels, and rows (or columns) of pixels are written to, to create a display. So-called active matrix displays have a memory element, typically a storage capacitor and a transistor, associated with each pixel whilst passive matrix displays have no such memory element and instead are repetitively scanned, somewhat similarly to a CRT picture, to give the impression of a steady image.

BRIEF DESCRIPTION OF THE DRAWINGS

Particular embodiments of the invention will now be more fully described, by way of example, with reference to the drawings, of which:

FIG. 4 shows a schematic diagram of a touch screen display device according to a second embodiment of the present invention; and FIG. 5 shows a schematic plan view of two rows of a array forming part of the touch screen display device of FIG. 4.

DETAILED DESCRIPTION

Figure 1:
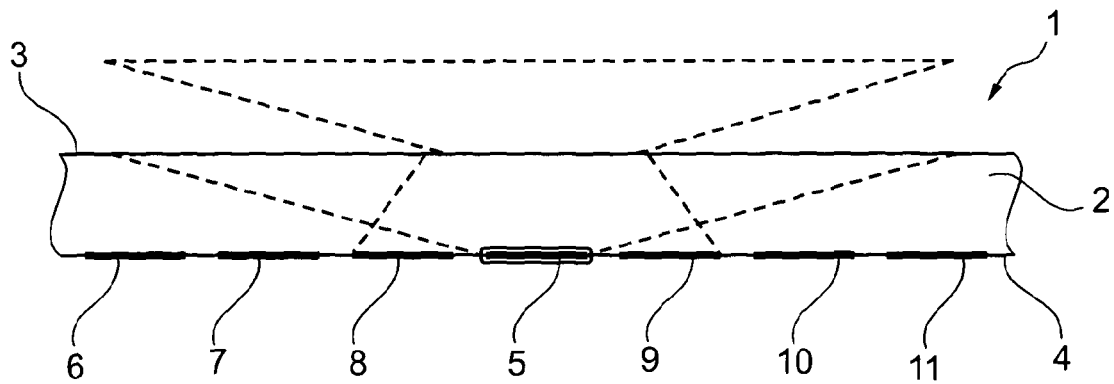
FIG. 1 shows a schematic diagram of a touch screen forming part of a display device according to one embodiment of the present invention.

Thus, as shown in FIG. 1, a touch screen 1 forming part of an OLED touch screen display device according to a first embodiment of the present invention is formed by a transparent substrate 2 having a front surface 3 and a back plane 4 on which are formed a first array of OLED emitters and a second array of detectors. In FIG. 1, for simplicity, only one emitter is shown, together with a plurality of detectors, to enable the operation of the device to be more easily explained. As shown, the back plane 4 of the transparent substrate 2 is provided with an OLED emitter 5 and a number of detectors 6-11 arranged either side of the emitter 5. Light from the OLED emitter 5 is emitted over a wide range of angles up to 180°, although a coverage of approximately 120°, is shown for clarity. Light that is emitted at angles greater than the critical angle for the transparent substrate is totally internally reflected from the front surface 3 of the transparent substrate 2 and reaches detectors 6, 7, 10, 11, as shown, whereas light that is emitted by the emitter 5 at an angle smaller than the critical angle is transmitted through the substrate 2 and then diverges after exiting the front surface 3 of the substrate 2.

Figure 2:
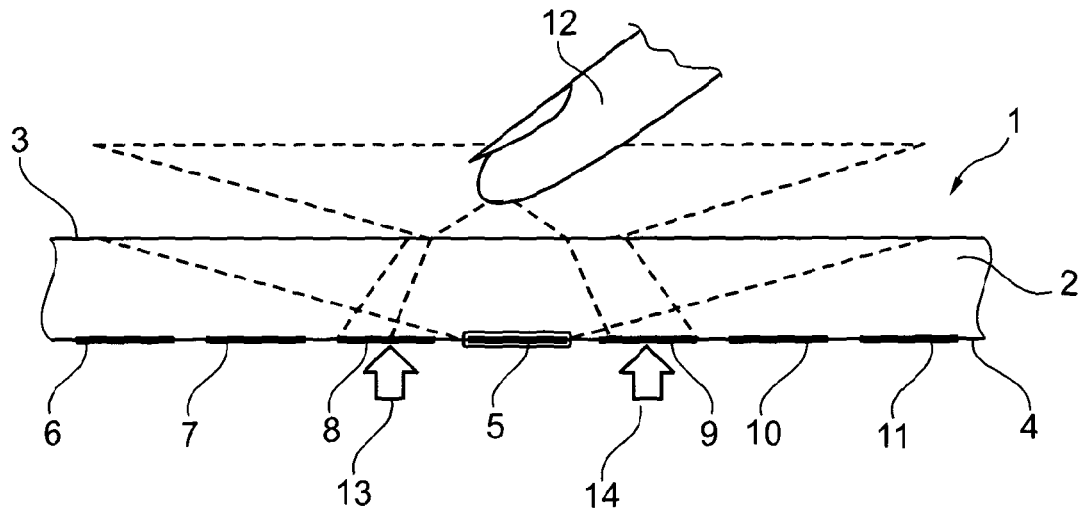
FIG. 2 shows the touch screen of FIG. 1 with a near field object.

When an object 12, such as a user's finger, approaches the touch screen, but without touching it, it becomes a near field object, as shown in FIG. 2. The near field object 12, which is located within the light that passes through the substrate, reflects back some of that light. As shown, the near field object 12 is positioned off-center with respect to the emitter 5, so more light is reflected to detector 8 (as shown by large arrow 13) and less light reaches detector 9 (as shown by small arrow 14). Thus, the presence and location of near field object can be determined by detecting increases in light received at a number of detectors from different emitters.

Figure 3:
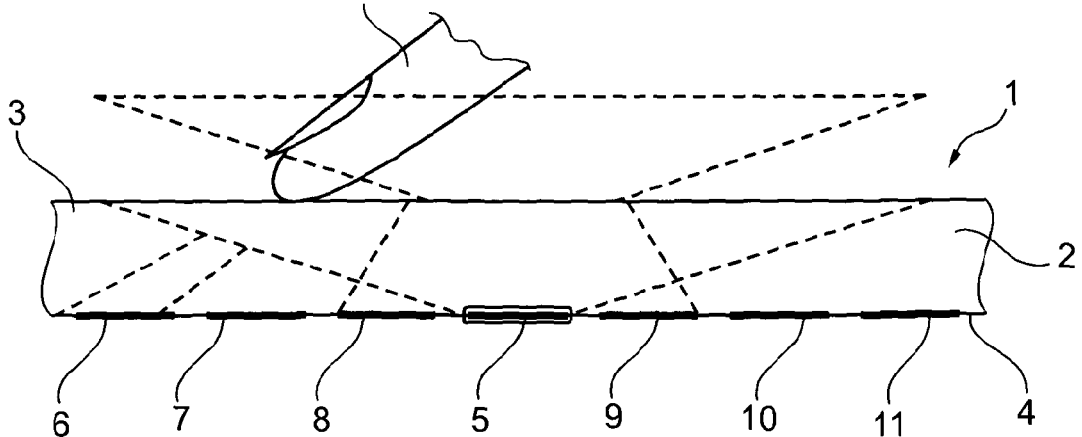
FIG. 3 shows the touch screen of FIG. 1 with a touching object.

Turning now to FIG. 3, there is shown an object 12, such as a user's finger, which is touching the front surface 3 of the transparent substrate 2 at a point where light from the emitter 5 is totally internally reflected from the front surface 3. In this case, the light which would otherwise reach detector 6 is prevented from doing so, because the total internal reflection is frustrated by the touching object 12. It will be apparent, therefore, that measuring the reduction in light received at a detector will enable the presence of a touching object to be determined. Furthermore, by detecting such reductions at a number of detectors from different emitters, the location of the touching object can be determined.

Although the above explanation has been made showing the light from one emitter to several detectors, it will be apparent that the situation is analogous when considering the light received at one detector from a plurality of emitter, with the light received from neighbouring emitters being due to reflection from near-field objects and light from further objects being from TIR, with frustration of that TIR light being due to touching objects. Thus, by constructing arrays of emitters and detectors, two digital representations can be produced through signal analysis—one for near-field objects and one for touching objects. Of course, a touching object can be considered as a (very) near-field object and will produce similar reflected light. However, a near-field object will not frustrate totally internally reflected light (unless it is extremely close to being in contact with the front surface), so the two types of objects can be discriminated by having both types of information.

As shown in FIG. 4, a touch screen display device according to a second embodiment of the present invention, has a back plane 21 on which are provided display pixels 22, emitters 23 and 24 and detectors 25, 26 and 27. In this embodiment, the back plane is a separate structural member from a transparent substrate 28 and is connected thereto by structural side elements 29 and 30. The display pixels 22 are preferably OLED display pixels and the emitters 23 and 24 are also preferably OLED emitters. The detectors may be organic photodetectors, such as phototransistors or photodiodes.

The light emitted by the display pixels 22, as shown by dotted lines 31, is coupled by any suitable coupling means 32, such as a conformal optically transparent material, to the transparent substrate 28. This light will, in general, be transmitted through the transparent substrate 28 and pass through a front surface 33 thereof, to produce a display image for viewing from the front of the touch screen display device. Similarly, light from emitters 23 and 24, as shown by long dashed lines 34, is coupled by a suitable coupling means (not shown for clarity), such as a conformal optically transparent material, to the transparent substrate 28. This light will, partly, be transmitted through the transparent substrate 28 and pass through the front surface 33 thereof, as described above with reference to FIGS. 1 to 3, and will partly be totally internally reflected at the front surface 33. The light that is totally internally reflected will be received by the detectors 25, 26 and 27. For ease of understanding, the light received by detector 25 is shown as dash and single dotted lines 35, irrespective of whether it is emitted by emitter 23 or emitter 24. Similarly, light received by detector 26 is shown as short dashed lines 36 and light received by detector 27 is shown as dash and double dotted lines 36. Again, suitable coupling means (not shown for clarity), such as a conformal optically transparent material, are provided to couple light between the transparent substrate 28 and the detectors 25, 26 and 27.

The components (display pixels 22, emitters 23 and 24 and detectors 25, 26 and 27) on the back plane 21 are connected to on-panel control circuitry 37 for controlling their operation. The on-panel control circuitry 37 is coupled to off-panel operational circuitry, including off-panel drivers 38, and processing circuitry 39. The processing circuitry 39 is used to analyse the light detected from the detectors 25, 26 and 27 and to produce a digital representation 41 (map) of the touch screen and any near field objects adjacent thereto and a digital representation 42 (map) of the touch screen and any touching objects adjacent thereto. An image generator 40 is coupled to the off-panel drivers 38 to control the off-panel drivers 38 to control the OLED display pixels 22 to produce the image(s) for display.

Turning now to FIG. 5, there is shown part of an array of display pixels 22, emitters 23 and 24 and detectors 25, 26 and 27 on the back plane 21. In this case, two rows are shown connected to separate on-off driver inputs 43 and 44. Both rows of components are also connected to the on-panel control circuitry 37. As shown, each of the components in a row are also connected to column driver inputs 45. By choosing to enable one particular row driver input 43 or 44 and using appropriate column driver inputs 45, each of the components of that row can be controlled, even when, as shown, all components of a particular column are coupled together to the same column driver input 45.

One example of how the device may be used to determine touching objects is shown in the top row of FIG. 5 (connected to row driver input 43). In this case, light (34, 35) from emitters 23 and 24 that is totally internally reflected at the front surface 33 of the transparent substrate 28 reaches detectors 25 and 26 in the usual manner. However, a touching object 46 that touches the front surface 33 of the transparent substrate 28 between detectors 26 and 27 frustrates the totally internally reflected light 36 so that it does not reach detector 27. Thus, the fact that light from emitters 23 and 24 reaches detector 26, but does not reach detector 27 means that it is frustrated by a touching object 46 located between detectors 26 and 27. It will be apparent that although the above example has been described with respect to only one row, by making similar measurements in a two dimensional array, for example, by switching emitters in only one row on, but having detectors in several adjacent rows on, can allow more accurate two-dimensional analysis to be made.

Of course, as described above, by determining how much light is received, and whether it is increased or decreased, the difference between frustrated totally internally reflected light and reflected light can be determined, thus providing information as to which emitters are "blocked" by the touching object, and which emitters have had light reflected by a near-field object.

A second example of how the device may be used in a more complicated manner to determine touching and near-field objects by determining at each detector, which emitter the light received at that detector was emitted from. This can be achieved by modulating the light emitted from each of the detectors at a different frequency. In this example, since there are two emitters 23 and 24, the light from emitter 23 can be modulated as a first square wave 47 and the light from emitter 24 can be modulated as a second square wave 48, having half the frequency of the first square wave 47. The combination of the first and second square waves 47 and 48 produces the combined waveform 49. It will thus be apparent that, depending on which modulated waveform is received at a particular detector, the position of the touching object can be determined. Furthermore, if a combined waveform is received, especially if there are more than two emitters and the combined waveform has light from a number of different emitters, it can be filtered using appropriate high and low pass filters to determine the amount of light received at each frequency, and therefore from each different emitter.

Once it has been determined, for each detector, whether light from a particular emitter has been received or not, a matrix providing the results for each emitter and detector in a particular row (or other set) can be generated. Thus, by comparing one matrix with another matrix generated later in time, changes due to reflection of light by near-field objects and frustration due to touching objects can be determined. It will be apparent, of course, that depending on how far the totally internally reflected light can travel, some results of emitter/detector pairs can be disregarded since they will never be positive, if the pair are too far apart. This would reduce the amount of data within a matrix that needed to be analysed by the processing circuitry to produce the digital representations (maps) of the touch screen showing any near-field objects and touching objects respectively.

It will be appreciated that further processing circuitry (not shown) can be used to analyse the digital representations 41 and 42 to provide a temporal analysis of the size, shape and location of the near-field and touching objects to be able to determine their lateral movement. By correlating the digital representations of the near field and touching objects and their movements, the processing circuitry can determine which of the near field objects have moved towards the touch screen to become touching objects and which touching objects have moved away from the touch screen to become near field objects. This allows the processing apparatus to utilize the lateral movement of a near field object to control movement of a virtual object, such as a computer cursor, and to utilize the movement of the near field object towards the touch screen to become a touching object as actuation of the cursor (i.e. a "click"). In this way, the system can respond to either movement of a cursor due to movement of a near field object or to actuation of the cursor due to the object touching the touch screen.

It will be appreciated that although only two particular embodiments of the invention have been described in detail, various equivalent means, modifications and improvements will be immediately apparent to a person skilled in the art without departing from the scope of the present invention.

The invention claimed is:

1. A touch screen display device comprising:
   a plurality of display pixels arranged upon a back plane of the touch screen display device,
   a transparent body having a front surface and a back surface, wherein the display pixels are disposed to transmit electromagnetic radiation through the transparent body from the back surface to the front surface,
   a plurality of emitters interspersed upon the back plane among the display pixels and emitting electromagnetic radiation so as to reach the front surface through the transparent body, and
   a plurality of detectors, interspersed upon the back plane among the display pixels, for detecting electromagnetic radiation, wherein the electromagnetic radiation emitted by an emitter at an angle smaller than the critical angle to the normal to said front surface of the transparent body is transmitted through said front surface and the electromagnetic radiation emitted by the emitter at an angle greater than the critical angle to the normal to said front surface is totally internally reflected,
   the touch screen display device further comprising processing apparatus coupled to the emitters and detectors operable to identify the electromagnetic radiation reaching each detector from different specific emitters and to discriminate between electromagnetic radiation that may be received by each detector by reflection from a near field object adjacent but not touching said front surface which is identified as an increase in the measured intensity of the light received by a respective detector, and electromagnetic radiation the total internal reflection of which may be frustrated by an object touching said front surface which is identified as a reduction in the measured intensity of the light received by a respective detector.

2. A touch screen display device as claimed in claim 1, in which the processing apparatus is adapted to discriminate the presence of a near field object adjacent but not touching said front surface by electromagnetic radiation emitted by one or more of the plurality of emitters and reflected by said near field object from an increase in the electromagnetic radiation from said one or more emitters detected by the plurality of detectors.

3. A touch screen display device as claimed in claim 1, in which the processing apparatus is adapted to discriminate the presence of an object touching said front surface from a decrease in the electromagnetic radiation emitted by one or more of the plurality of emitters detected by the plurality of detectors.

4. A touch screen display device as claimed in claim 1 in which the electromagnetic radiation emitted by each emitter is modulated in a characteristic way such that electromagnetic radiation emitted from a specific emitter and detected by a given detector can be identified from the characteristic modulation.

5. A touch screen display device as claimed in claim 1 in which the emitters and detectors are arranged in a two dimensional array, and comprising means to provide a digital representation of the location of any near field or touching objects.

6. A touch screen display device as claimed in claim 5, further comprising means to analyze the temporal variation of the detected locations of any near field or touching objects to determine lateral movement.

7. A touch screen display device according to claim 1, wherein the display pixels are Organic Light Emitting Diodes (OLEDs).

8. A touch screen display device according to claim 1, wherein the emitters are Organic Light Emitting Diodes (OLEDs).

9. A touch screen display device according to claim 1, wherein the detectors are organic photodetectors.

10. A touch screen display device according to claim 1, wherein the number of emitters is greater than the number of detectors.

11. A touch screen display device according claim 1, wherein the number of emitters is substantially the same as the number of detectors.

12. A touch screen display device according to claim 1, wherein the electromagnetic radiation is at an infra-red wavelength.

13. A touch screen display device according to claim 1, wherein at least the display pixels are coupled to an active matrix driver arrangement.

14. A touch screen display device according to claim 1, wherein the processing apparatus is operable to analyze the electromagnetic radiation reaching each detector from different specific emitters to produce a digital representation of the touch screen showing any near field object.

15. A touch screen display device according to claim 1, wherein the processing apparatus is operable to analyze the electromagnetic radiation reaching each detector from different specific emitters to produce a digital representation of the touch screen showing any touching object.

16. A method of discriminating between an object touching the front surface of a display and an object adjacent but not touching it, the method comprising:

illuminating a transparent body defining the front surface of the display with electromagnetic radiation through the transparent body from a back plane of the display, wherein one or more pixels of the display, one or more emitters emitting the electromagnetic radiation, and one or more detectors configured to detect electromagnetic radiation are interspersed upon the back plane, the electromagnetic radiation having a range of incident angles to the surface, the range of incident angles including angles greater and smaller than the critical angle for total internal reflection within the transparent body;

measuring the intensity of electromagnetic radiation coming back from the surface of the transparent body; and identifying a reduction in the measured intensity as the presence of an object in contact with the surface, and identifying an increase in the measured intensity as the presence of an object adjacent but not touching said surface.

\* \* \* \* \*